US007177854B2

(12) United States Patent
Chun et al.

(10) Patent No.: US 7,177,854 B2
(45) Date of Patent: Feb. 13, 2007

(54) DYNAMIC UPDATE CUBE AND HYBRID QUERY SEARCH METHOD FOR RANGE-SUM QUERIES

(75) Inventors: Seok-Ju Chun, Seoul (KR); Chin-Wan Chung, Taejon (KR); Ju-Hong Lee, Incheon (KR); Seok-Lyong Lee, Yongin-si (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 753 days.

(21) Appl. No.: 10/120,535

(22) Filed: Apr. 9, 2002

(65) Prior Publication Data

US 2003/0093424 A1 May 15, 2003

(30) Foreign Application Priority Data

Sep. 10, 2001 (KR) ............................... 2001-55489
Jan. 15, 2002 (KR) ............................... 2002-2337

(51) Int. Cl.
*G06F 17/30* (2006.01)
(52) U.S. Cl. ............................................. 707/2; 707/3
(58) Field of Classification Search .................... 707/2, 707/3, 100, 102, 104.1
See application file for complete search history.

(56) References Cited

U.S. PATENT DOCUMENTS 5,799,300 A * 8/1998 Agrawal et al. ............... 707/5
5,890,151 A * 3/1999 Agrawal et al. ............... 707/5
5,926,820 A * 7/1999 Agrawal et al. ............. 707/200
2003/0018623 A1* 1/2003 Aggarwal et al.

OTHER PUBLICATIONS

An article entitled "Hierarchical Cubes For Range-Sum Queries," By Chan et al., published by Department of Computer Sciences, pp. 1-52.
An article entitled "Algorithms for the Relative Prefix Sum Approach to Range Sum Queries in Data Cubes," By Geffner et al., published by Department of Computer Science, pp. 1-22.
An article entitled "The Dynamic Data Cube," By Geffner et al., published by Department of Computer Science, pp. 1-12.
An article entitled "Range Queries in OLAP Data Cubes," By Ho et al., published by IBM Almaden Research Center, pp. 1-16.

* cited by examiner

*Primary Examiner*—Greta Robinson
(74) *Attorney, Agent, or Firm*—Bachman & LaPointe, P.C.

(57) ABSTRACT

Disclosed herein is a dynamic update cube and hybrid query search method for range-sum queries. The present invention relates to a hybrid query search method, which provides a precise answer or an approximate answer with respect to On-Line Analytic Processing (OLAP) queries by using a delta (Δ)-tree, which has a multidimensional index structure and a prefix-sum cube, so as to effectively support range-sum queries widely used in opinion decisions in enterprises. In the dynamic update cube and hybrid query search method for range-sum queries, a prefixed-sum cube is dense and the dynamic update cube is sparse, such that whenever a data cube changes, the prefixed sum cube is not directly updated and instead, the changes of the data cube are stored in a Δ-Tree and the Δ-Tree is managed.

7 Claims, 16 Drawing Sheets

Fig.1a

| Index | 0 | 1 | 2 | 3 | 4 | 5 | 6 | 7 |
|---|---|---|---|---|---|---|---|---|
| 0 | 4 | 5 | 2 | 8 | 3 | 7 | 5 | 6 |
| 1 | 2 | 1 | 5 | 3 | 7 | 2 | 4 | 2 |
| 2 | 5 | 3 | 9 | 3 | 4 | 7 | 1 | 3 |
| 3 | 3 | 5 | 6 | 1 | 8 | 5 | 1 | 6 |
| 4 | 3 | 2 | 1 | 4 | 7 | 8 | 6 | 4 |
| 5 | 6 | 2 | 2 | 6 | 1 | 9 | 5 | 2 |

Fig.1b

| Index | 0 | 1 | 2 | 3 | 4 | 5 | 6 | 7 |
|---|---|---|---|---|---|---|---|---|
| 0 | 4 | 9 | 11 | 19 | 22 | 29 | 34 | 40 |
| 1 | 6 | 12 | 19 | 30 | 40 | 49 | 58 | 66 |
| 2 | 11 | 20 | 36 | 50 | 64 | 80 | 90 | 101 |
| 3 | 14 | 28 | 50 | 65 | 87 | 108 | 119 | 136 |
| 4 | 17 | 33 | 56 | 75 | 104 | 133 | 150 | 171 |
| 5 | 23 | 41 | 66 | 91 | 121 | 159 | 181 | 204 | number of data in the Δ-tree

Fib. 15b

Approximation level

DYNAMIC UPDATE CUBE AND HYBRID QUERY SEARCH METHOD FOR RANGE-SUM QUERIES

BACKGROUND OF THE INVENTION

1. Field of the Invention

The present invention relates generally to dynamic update cubes for range-sum queries, and more particularly to a hybrid query search method, which provides a precise answer or an approximate answer with respect to On-Line Analytic Processing (OLAP) queries by using a delta ($\Delta$)-tree, which has a multidimensional index structure and a prefix-sum cube, so as to effectively support range-sum queries widely used in opinion decisions in enterprises.

2. Description of the Prior Art

Generally, On-Line Analytic Processing (OLAP) is a category of database technology allowing analysts to gain insight on an aggregation of data through access to a variety of possible views of information. This technology often requires the summarization of data at various levels of detail and with various combinations of attributes.

Typical OLAP applications include product performance and profitability, effectiveness of a sales program or marketing campaign, sales forecasting, and capacity planning. Among various OLAP application areas, a data model for the multidimensional database (MDDB), which is also known as a data cube, becomes increasingly important.

The data cube is constructed from a subset of attributes in the database. Certain attributes are chosen to be measure attributes, i.e., the attributes whose values are of interest. Other attributes are selected as dimensions or functional attributes. The measure attributes are aggregated according to their dimensions.

For example, consider a data cube maintained by a car-sales company. It is assumed that the data cube has four dimensions, i.e., MODEL_NO., YEAR, REGION, and COLOR, and one measure attribute, i.e., AMOUNT_OF_SALES. In this case, assume that the domain of MODEL_NO. contains 30 models, YEAR ranges from 1990 to 2001, the REGION dimension contains 40 regions, and COLOR lists white, red, yellow, blue, gray, and black. The data cube therefore has 30×12×40×6 cells, and each cell contains AMOUNT_OF_SALES as a measure attribute for the corresponding combination of four functional attributes, i.e., MODEL_NO., YEAR, REGION, and COLOR.

The data cube provides a useful analysis tool on data called a range-sum query that applies an aggregate operation to the measure attribute within the range of the query.

A typical example may include "Find the total amount of sales in Seoul for all models of red color between 1995 and 2000". Queries of this form for obtaining the range-sum are very popular, and the response time is very important for the OLAP application, which needs user-interaction with respect to a corresponding query.

A direct method for processing the range-sum query is to access the data cubes themselves.

However, this methods suffers from the fact that too many cells require access to calculate the range-sum, and at this time, the number of cells to be accessed is proportional to the size of a sub-cube defined by the query.

To improve the direct method and enhance search efficiency, a prefix-sum method using a prefix-sum cube (PC) has been proposed. The prefix-sum method focuses on reducing the search cost.

Current enterprise environments force data elements in the cube to be dynamically changed. In such environments, the response time is affected by the update time as well as by the search time of the cube.

Therefore, various methods have been proposed to reduce the update cost by improving the prefix-sum method. These methods use additional data structures such as a relative prefix-sum cube (RPC) to minimize the update propagation over the prefix-sum cube (PC).

However, these methods have some limitations in that, even though they reduce the update propagation, to some degree improving the update speed, the update speed is not sufficiently improved, because the RPC is merely a slight transformation of the PC. Furthermore, these methods are problematic in that their search efficiencies are decreased so as to accomplish their accelerated update capabilities.

Therefore, in many OLAP applications, it becomes an important issue to improve the update performance while minimizing sacrifice in the search efficiency.

As described above, various new methods addressing the query on an OLAP data cube are proposed in the prior art.

An elegant algorithm, which is called the prefix-sum method, for computing range-sum queries in data cubes, is proposed in a thesis entitled "Range queries in OLAP Data Cubes" by C. Ho, R. Agrawal, N. Megido and R. Srikant and published in "Proceedings of ACM SIGMOD Int'l Conference on Management of Data," 1997", pp. 73–88 (hereinafter, the thesis is referred to as HAMS97). The essential idea of is to pre-compute many prefix-sums of the data cube and to use these pre-computed results for answering arbitrary queries at run-time.

However, even though the prefix-sum method reduces response times for queries, it is very expensive to maintain the prefix-sum cube when data elements in the cube are changed.

In order to reduce the update propagation in the prefix-sum cube, a method using the relative prefix-sum cube (PRC) is proposed in the thesis "Relative prefix-sums: an efficient approach for querying dynamic OLAP Data Cubes" by S. Geffner, D. Agrawal, A. El abbadi, and T. Smith and published in "Proceedings of Int'l Conference on Data Engineering, Australia," 1999, pp. 328–335 (hereinafter, the thesis is referred to as GAES99). This method attempts to balance the query-update tradeoff between the prefix-sum method and the direct method. However, this method is problematic in that it is impractical in data cubes of large dimensions and high capacity since the update cost increases exponentially.

In order to solve the problem, a new class of cube called Hierarchical Cube (HC), based on two orthogonal dimensions, is proposed a thesis entitled "Hierarchical cubes for range-sum queries" by C. Y. Chan, and Y. E. Ioannidis and published in "Proceedings of Int'l Conference on Very Large Data Bases," Scotland, 1999, pp. 675–686 (hereinafter, the thesis is referred to as CI99). A hierarchical band cube described in this thesis has a significantly better query and update trade-off than that of the algorithm proposed in the thesis GAES99. However, this method is problematic in that an index mapping from a high level "abstract" cube to a low-level "concrete" cube is too complicated to be successfully implemented.

More recently, a dynamic data cube designed by recursively decomposing the prefix-sum cube is proposed in a thesis entitled "The dynamic Data cube" by S. Geffner, D. Agrawal, and A. El Abbadi and published in "Proceedings of Int'l conference on Extending Database Technology," Germany, 2000, pp. 237–253 (hereinafter, the thesis is referred to as GAE00). In the thesis GAE00, it is assumed that each dimension of a data cube is of the same size. Further, a tree structure is constituted by such a decomposition technique.

However, the data cube of a practical environment, like the example of car-sales company described above, has dimensions of different sizes, as such makes it difficult to keep the balance of the tree while decomposing the prefix-sum cube. Further, if the data cube is of high dimensions and high capacity, this method may cause problems, such as the incurrence of a computation overhead.

SUMMARY OF THE INVENTION

Accordingly, the present invention has been made keeping in mind the above problems occurring in the prior art, and an object of the present invention is to provide an efficient dynamic update cube, which can reduce the update cost while taking advantages of a prefix-sum method, by using a delta ($\Delta$)-tree indexing structure.

Another object of the present invention is to provide a hybrid query search method, which can improve a query processing time by searching for an approximate result (answer) or a precise result (answer) by simultaneously using a prefix-sum cube and a dynamic update cube ($\Delta$-tree) with respect to OLAP range-sum queries, wherein the dynamic update cube is designed such that the difference between the values of the original data and those of the changed data is stored in a hierarchical structure called $\Delta$-tree when arbitrary data in a multidimensional data cube are changed.

Still another object of the present invention is to provide a query search method, in which a data cube is divided into a prefix-sum cube and a dynamic update cube of a $\Delta$-tree hierarchical structure and managed, the range-sum of a query range is obtained from the prefix-sum cube, the range-sum of the query range is obtained from the dynamic update cube, and the resulting value is obtained by adding the two range-sum values.

In accordance with one aspect of the present invention, the above and other objects can be accomplished by the provision of a dynamic update cube, which uses an efficient algorithm for significantly reducing the update propagation by using an indexing structure called the $\Delta$-tree. That is, various multi-dimensional indexing structures have been proposed since the R-trees. The $\Delta$-tree is a modified version of the R*-tree and is used to store the updated values of a data cube and to support the efficient query processing. The $\Delta$-tree takes an advantage of the conventional prefix-sum method to gain considerable search efficiency while significantly reducing the update cost. Further, in many current enterprise applications like the decision support system, there are a number of trial-and-error steps involved in getting the right answer: they force range-sum queries to be executed too many times, which causes severe query cost. Thus, it is important to provide the facility to get a quick approximate result rather than a slower more accurate one to support a more timely decision-making process. Therefore, this invention provides a hybrid method to provide either an approximate result or a precise one in order to reduce the overall costs of queries for collecting information for decision making.

BRIEF DESCRIPTION OF THE DRAWINGS

The above and other objects, features and other advantages of the present invention will be more clearly understood from the following detailed description taken in conjunction with the accompanying drawings, in which:

FIGS. 1a and 1b are views showing corresponding data of a conventional 6×8 data cube in two-dimensions and corresponding data of its prefix-sum cube (PC), respectively;

FIGS. 15a and 15b are graphs respectively showing the performance and error rates for obtaining approximate answers if data are uniformly distributed, the dimensionalities are varied from two to five, and the number of data is 50,000 according to this invention.

DESCRIPTION OF THE PREFERRED EMBODIMENTS

Hereinafter, a dynamic update cube and hybrid query search method for range-sum queries is described, according to a preferred embodiment of the present invention.

Before the dynamic update cube and hybrid query search method for range-sum queries can be adequately described, a prefix-sum cube closely related to a method proposed in the present invention is described, as follows:

In the prefix-sum method, a prefix-sum cube (PC) of the same size as data cube A is used, wherein various pre-computed prefix-sums of A are stored in the prefix-sum cube (PC). Each cell of the PC contains the sum of all cells in the data cube A and of itself.

FIG. 1 shows an example of a 6×8 data cube and a prefix-sum cube (PC) corresponding to the data cube. A cell PC[4,6] contains the sum of all cells in the range A[0,0] to A[4,6]. Therefore, the sum of the entire data cube A is contained in the last cell PC[5,7]. Assuming that a set of dimensions is D={1,2, ... d}, and $n_i$ is the number of cells in each dimension, a method requiring $$N = \prod_{i=1}^{d} n_i$$

additional cells is proposed in the thesis HAMS97 so as to store the pre-computed prefix-sums. In this method, any dimensional range-sum can be computed in $2^d-1$ computation step based on $2^d$ appropriate prefix-sums.

Formally, for all $x_i$ and i satisfying $0 \leq x_i < n_i$ and $i \in D$ the prefix-sums are defined as the following Equation [1]

$$PC[x_1, x_2, \ldots, x_d] = Sum(0:x_1, 0:x_2, \ldots, 0:x_d) \quad [1]$$
$$= \sum_{i_1=0}^{x_1} \sum_{i_2=0}^{x_2} \cdots \sum_{i_d=0}^{x_d} A[i_1, i_2, \ldots, i_d]$$

For example, if d is 2, for all $0 \leq x < n_1$ and $0 \leq y < n_2$, the prefix-sum is expressed as the following Equation [2].

$$PC[x, y] = Sum(0:x, 0:y) = \sum_{i=0}^{x} \sum_{j=0}^{y} A[i, j] \quad [2]$$

FIG. 1 is a view showing a data cube A $[x_1, x_2]$ in two-dimensions and a prefix-sum cube PC[[$x_1, x_2$] corresponding to the data cube. The prefix-sum method is very powerful, such that it can process range-sum queries in constant time, regardless of the size of the data cube.

Any range-sum of the data cube A can be computed from $2^d$ appropriate elements of the prefix-sum cube PC and is defined as the following Equation [3], $$Sum(l_1:h_1, l_2:h_2, \ldots, l_d:h_d) = \quad [3]$$
$$\sum_{\forall x_j \in \{l_j-1, h_j\}} \left\{ \left( \prod_{i=1}^{d} s(i) \right) * PC[x_1, x_2, \ldots, x_d] \right\}$$

where $$s(j) = \begin{cases} 1, & \text{if } x_j = h_j \\ -1, & \text{if } x_j = i_j - 1 \end{cases} \text{ and } j \in D.$$

The left-hand side of the above Equation [3] specifies a range-sum of A, and its right side consists of $2^d$ additive terms, each of which is from an element of PC with a sign "+" or "−" determined by the product of all s(i)s. For convenience of notation, it is assumed that PC[$x_1, x_2, \ldots, x_d$]=0 if $x_j$=−1 and for some $j \in D$.

Figure 2:
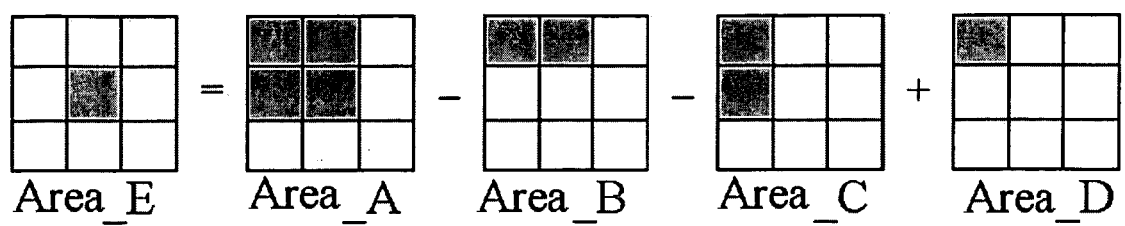
FIG. 2 is a view showing a process for obtaining the results of a partial range-sum query using a conventional prefix-sum cube.

For example, if d is 2, a range-sum Sum $(l_1:h_1, l_2, :h_2)$ is obtained by the following computation: PC $[h_1, h_2]$−PC $[h_1, l_2-1]$−PC $[l_1-1, h_2]$+PC $[l_1-1, l_2-1]$. As shown in FIG. 1, the range-sum Sum [1:4, 2:6] can be derived from the following computation: PC[4,6]−PC[0,6]−PC[4,1]+PC[0,1]=150−34−33+9=102. This computation is geometrically expressed as shown in FIG. 2. That is, the sum of the data cube in query area E can be obtained by subtracting areas B and C from area A, and adding area D, which is subtracted twice, to the subtracted result.

As the Internet technologies such as the World Wide Web become more advanced, users can use OLAP servers regardless of time and location. The users are widely spread geographically, and a great number of users want to use a large scale OLAP server concurrently. In such environments, performance becomes a major issue when query processing and dynamic data updates are simultaneously performed.

Moreover, in conventional methods based on the prefix-sum cube (PC), if queries of users include a single cell that needs to be changed due to the update process, these queries are blocked. Otherwise, the queries produce incorrect answers.

In other words, one update operation can cause many queries to be blocked. Therefore, it is clear that if the update cost is high, the blocking decreases the overall performance of the OLAP server.

The OLAP server is widely used as a system for supporting a decision-making process. A number of users execute a plurality of queries related to their concerns until they reach some decision. If all queries require precise answers, they incur a high cost in their execution and represent a taxing burden to the OLAP server.

If, on the other hand, approximate answers are provided for all queries, users are confused with inexact answers.

Therefore, the present invention proposes a hybrid method, which reduces a query range by finding queries of interest using approximate answers, then obtains exact answers in the query range.

Meanwhile, in dynamic OLAP environments, cells of the data cube are frequently changed, such that the cost of updating the prefix-sum cube is greatly increased. Therefore, the present invention stores and manages the changed cells using a virtual cube called "dynamic update cube" instead of directly storing them in the prefix-sum cube (PC). In this case, if a user inputs a range-sum query, the range-sum query is processed by simultaneously manipulating the prefix-sum cube (PC) and the dynamic update cube.

The prefix-sum cube is always dense, regardless of the density of the data cube. On the other hand, the dynamic update cube is sparse, because it involves only the changed cell value of the data cube.

Figure 3:
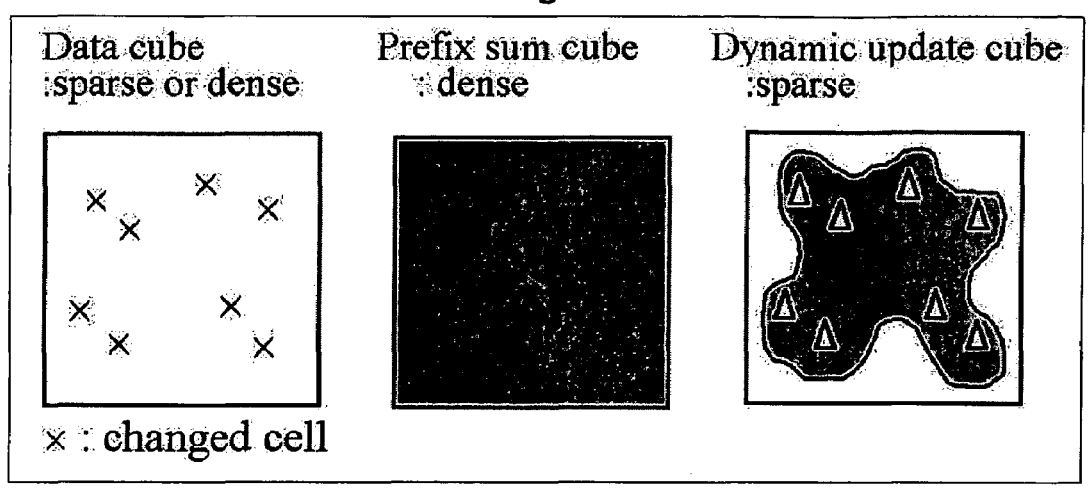
FIG. 3 is a view showing the basic concept of a dynamic update cube according to the present invention.
Figure 4:
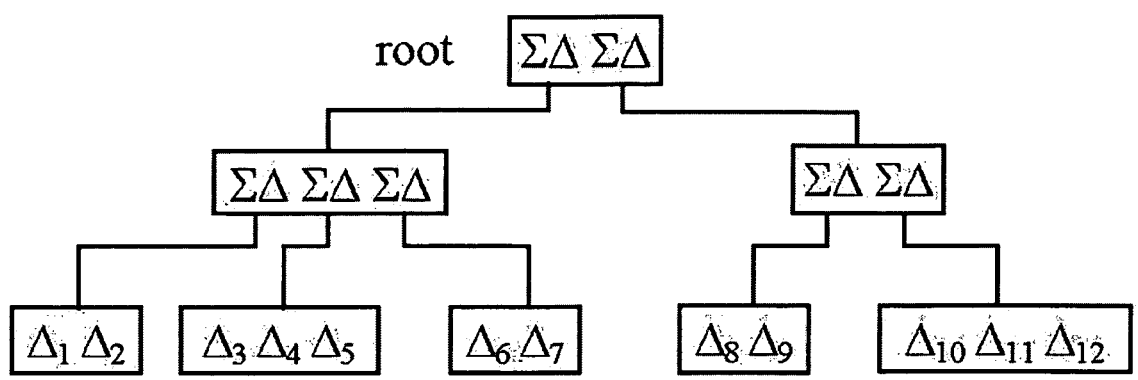
FIG. 4 is a block diagram of a $\Delta$-tree of this invention.

In other words, even if the data cube is sparse as shown in FIG. 3, the prefix-sum cube (PC) is always dense, because it stores the cumulative sums of data cube cells. Referring to the Drawings, "x" of FIG. 3a is a changed cell, and "Δ" of FIG. 3c is the difference between new and old vales of the changed cell. That is, "Δ" is defined as $\Delta = x_{new} - x_{old}$. The dynamic update cube is always sparse because it stores only Δ values.

The positions of the dynamic update cube cells can be represented by points in a multidimensional space. Therefore, these cells are stored in a multidimensional index structure called the Δ-Tree.

The cells spatially close to each other are clustered into a corresponding minimum bounding rectangle (MBR). When the Δ-Tree is searched, non-overlapping MBRs of the Δ-Tree are efficiently pruned. More details are described later. The positions and Δ values of the dynamic update cube cells are stored in the Δ-Tree.

The present invention is realized as follows. First, since the prefixed sum cube is dense and the dynamic update cube is sparse, whenever the data cube changes, the prefix-sum cube is not directly updated. Instead, the changed information of the data cube is stored in the Δ-Tree, and the Δ-Tree is managed.

This reduces the update cost and resolves the problem of update propagation occurring in the prefixed-sum method.

Second, when a range-sum query is processed, an approximate answer is obtained by searching the Δ-tree partially. That is, the approximate answer is computed by searching from the root of the Δ-Tree to an internal node of level i, instead of a leaf node of the Δ-Tree.

Third, the size of the Δ-tree is increased as the cells of the data cube are changed. When the Δ-tree is too large, the costs of search and update become high. Thus, in the present invention, all information stored in the Δ-Tree is periodically reflected on the prefix-sum cube, depending on applications, i.e., weekly, monthly, or at some threshold. Such periodic reflections are so-called 'bulk updates'.

A technique for storing the changed information of the data cube in the Δ-tree and managing the Δ-tree is described.

First, the structure of the Δ-tree and its construction process are described in detail.

The Δ-tree is constructed by the same process as the R*-tree. Initially, the Δ-tree has only a directory node called a root node.

Whenever the data cube cell is updated, the difference Δ between the new and old values of the data cube cell and its spatial position information are stored in the Δ-tree. The Δ-tree is formalized as follows.

If a directory node contains $(L_1, L_2, \ldots, L_n)$, $L_i$ is the tuple about an i-th child node $C_i$ and each tuple has the form of $(\Sigma\Delta, M, cp_i, MBR_i)$.

$\Sigma\Delta$ is the sum of all $\Sigma\Delta$ values(Δ values) of $C_i$ if $C_i$ is a directory node (data node). $cp_i$ is the address of $C_i$ and an $MBR_i$ is the MBR enclosing all entries in $C_i$. M has the form of $(\mu_1, \mu_2, \ldots, \mu_d)$ where d is the dimension. Further, $\mu_j$ is the mean position of the j-th dimension of $MBR_i$ and is defined as $$\mu_j = \frac{\sum_{m=1}^{n_j} mF_j(m)}{\sum_{m=1}^{n_j} F_j(m)}.$$

Here, $$F_j(m) = \sum_{\substack{k_h=1,n_k \\ k_j=m \\ h \neq j}} f(k_1, \ldots, k_j, \ldots, k_d),$$

where, $f(k_1, k_2, \ldots, k_d)$ is the value of an update position $(k_1, k_2, \ldots, k_j, k_d)$ in $MBR_i$. Here, $k_j$ is in the range $1 \leq k_j \leq n_j$, where $n_j$ is the number of partitions of the j-th dimension of $MBR_i$.

A data cube is at level 0 and it contains $(D_1, D_2, \ldots, D_n)$ where $D_i$ is the tuple about i-th data entry and has the form of $(P_i, \Delta_i)$. Here, $P_i$ is the position index and $\Delta_i$ is the difference between the new and old values of the changed cell.

The objective of using $\Sigma\Delta$ is to provide both fast and approximate answers of the range-sum query, and the objective of using M is to improve the approximation technique.

The present invention uses both the prefix-sum cube (PC) and the Δ-tree so as to answer the range-sum query. The PC includes information which has been most recently bulk-updated, while the Δ-tree includes information which is updated from a recent update. The update cells, which are spatially close to each other, are clustered into a corresponding MBR.

FIG. 5 is a view showing the range-sum query in the data cube and the dynamic update cube of this invention.

Figure 5A:
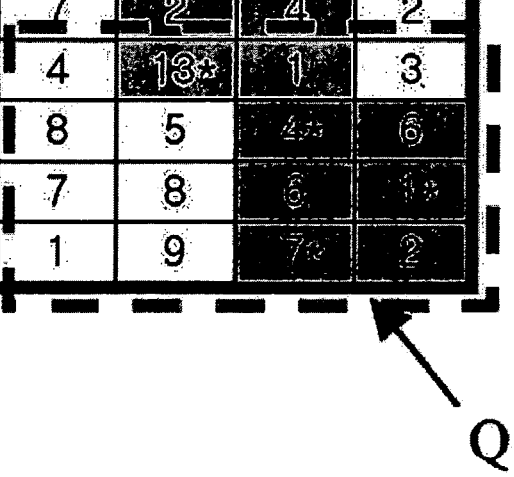
FIGS. 5a and 5b are views showing a range-sum query in a data cube and a dynamic update cube of this invention, respectively.
Figure 5B:
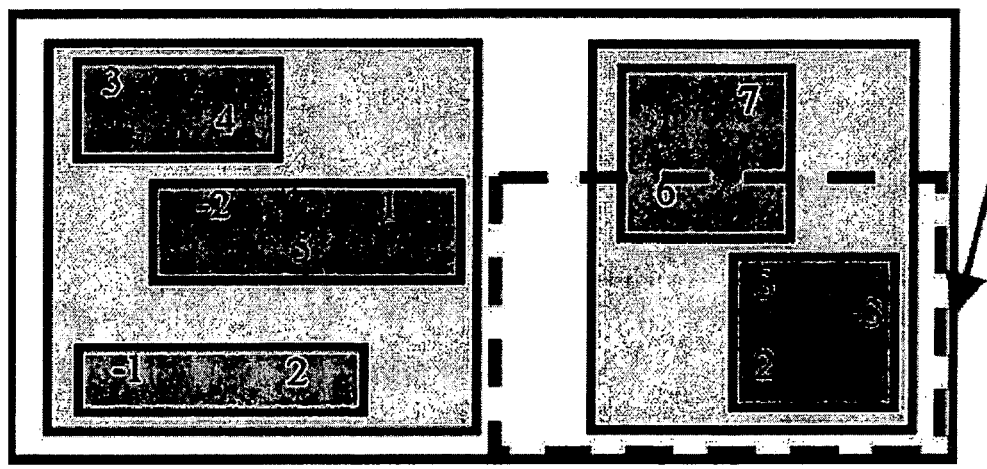

Referring to FIG. 5a, cells marked by the symbol '*' indicate cells most recently updated from the data cube of FIG. 1a. Referring to FIG. 5b, each MBR in the lowest level of the dynamic update cube contains cells which have not yet been reflected to PC.

If a range-sum query $Q=(l_1:h_1, l_2:h_2, \ldots, l_d:h_d)$ is given, both the PC and the Δ-tree are used to obtain the answer to Q. It is assumed that Sum (Q) is a function for returning the answer of Q, PC_sum (Q) is a function for returning the answer calculated from PC, and Δ_sum (Q) is a function for returning the answer obtained from the Δ-tree. Thus, the answer to the query Q is defined as the following Equation [4].

$$\text{Sum}(Q) = PC\_sum(Q) + \Delta\_sum(Q) \quad [4]$$

A method for obtaining an answer of the range-sum query Q with respect to the data cube of FIG. 5 using the PC and Δ-tree is described as follows:

If the range-sum query Q is the query for obtaining the sum of range $2 \leq x \leq 5$ and $4 \leq y \leq 7$ from the data cube FIG. 5a, the answer of the query is defined as sum (2:5, 4:7)= PC_sum (2:5, 4:7)+Δ_sum (2:5, 4:7). The function PC_sum (2:5, 4:7) can be directly computed from the above Equation [3].

Next, the result of the function Δ_sum (2:5, 4:7) can be obtained as follows:

When the Δ-tree is searched, a root node is at first visited, and the spatial relationship between $MBR_Q$ (here, $MBR_Q$ is the MBR of the query Q) and $MBR_T$ (here, $MBR_T$ is the MBR of the node T) is evaluated with respect to each entry of the root node.

The function Δ_sum(Q) is obtained as follows. The relationship between $MBR_Q$ and $MBR_T$ of each entry of the node is evaluated with respect to all nodes in the Δ-tree in the depth first order starting from the root node, such that disjointed, inclusive, and intersecting operations are performed.

In the case of a disjointed operation, a sub-tree of $MBR_T$ entry that is irrelevant to the query Q is pruned. In the case of inclusive operation, $\Sigma\Delta$ of $MBR_T$ entry relevant to the query Q is added to the answer. It is not necessary to traverse the sub-tree any more, because $\Sigma\Delta$ has an exact answer with respect to this entry.

In the case of an intersecting operation, there is a need to evaluate every child MBR that is included in $MBR_T$ so as to obtain a precise answer for the range-sum. However, in order to approximate an answer, the approximate $\Sigma\Delta$ of the entry related to $MBR_T$ is computed and added to the answer. The detailed description on how to obtain the approximate answer is described in detail later. The algorithm Δ_sum() is recursively performed with respect to the sub tree under this entry.

Here, the relation between $MBR_Q$ and $MBR_T$ is formally defined by the following Equation [5].

$$\begin{array}{ll} \text{disjoint if} & MBR_Q \cap MBR_T = \phi \\ \text{inclusive if} & MBR_Q \supseteq MBR_T \\ \text{intersecting if} & MBR_Q \cap MBR_T \neq \phi \text{ and not inclusive} \\ \text{where} & MBR_Q \subset MBR_T \text{ is defined to be intersecting} \end{array} \quad [5]$$

Figure 6A:
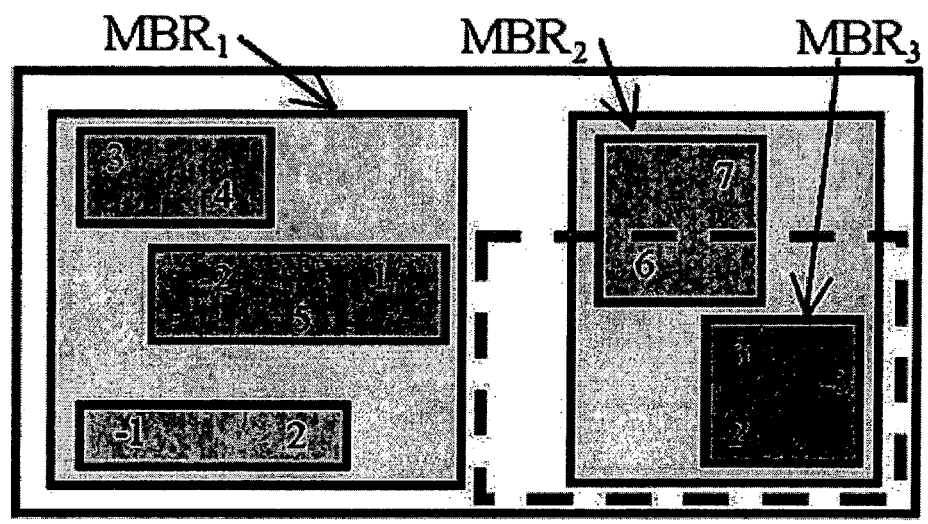
FIG. 6a is a view showing the dynamic update cube of this invention.
Figure 6B:
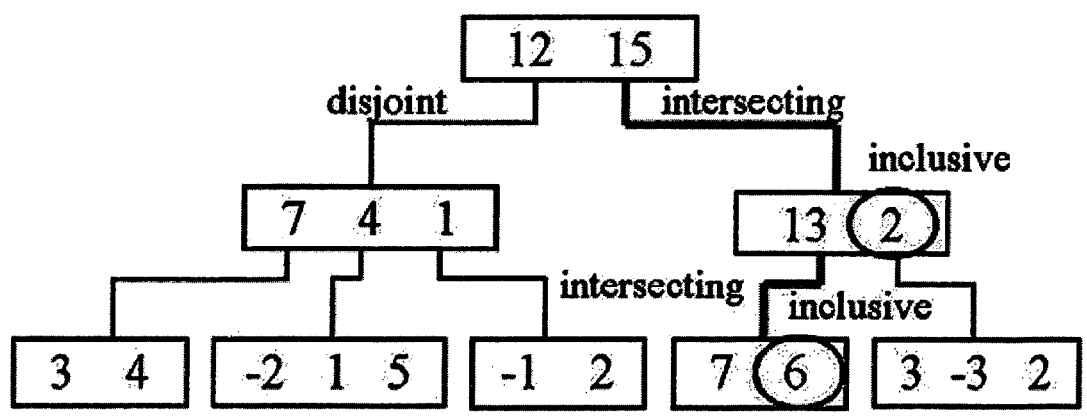
FIG. 6b is a view showing a $\Delta$-tree corresponding to the dynamic update cube.

As shown in FIG. 6, if a range-sum query Q(2:5, 4:7) is given, $MBR_1$ is disjointed, $MBR_2$ is intersecting, and $MBR_3$ is inclusive with respect to the range sum query. Therefore, the answer of the function $\Delta\_sum$ (2:5, 4:7) is 8, and the function Sum (2:5, 4:7) is computed as the following Equation [6].

$$\begin{aligned} Sum(2:5, 4:7) &= PC[5,7] - PC[1,7] - PC[5,3] + \\ & PC[1,3] + \Delta\_sum(2:5, 4:7) \\ &= (204 - 66 - 91 + 30) + (6 + 2) = 85 \end{aligned} \quad [6]$$

Hereinafter, a method for updating the PC according to the changed value of a cell in the data cube is described.

When the value of a cell in the data cube is changed, the value of an appropriate location in the Δ-tree is changed, without affecting the prefix-sum cube. Consider how the update of the value of a cell affects the Δ-tree when the value of a cell in the data cube is changed. An update request is given in the form (P, Δ) where P is the position index and Δ is the difference between new and old values of the changed cell. The first step for the update is to identify a sub-tree into which the update is made.

The selection of a target sub-tree for the update is the same as that of R*-tree. That is, a target data node for reflecting the update request is finally selected by repeatedly identifying the sub-trees into which the update is made. Once the target data node is identified, it must be determined whether or not the data entry with the position P exists in the node. There are two cases: when the position P exists or when the position P does not exist.

When the position P exists, the update is made in the data entry (P, $\Delta_{OLD}$), where $\Delta_{OLD}$ is the existing Δ value of the position P. This Δ value is added to the $\Delta_{OLD}$. Then, for all ancestors of the data node in the tree, $(\Sigma\Delta)_{ancestor} = (\Sigma\Delta)_{ancestor} + \Delta$ is set, where $(\Sigma\Delta)_{ancestor}$ is (ΣΔ) of the ancestor node of the data node. This process is repeated up to the root node.

Conversely, if the position P does not exit, the data entry (P, Δ) is inserted into the end of the node. Further, for all ancestors of the data node, $(\Sigma\Delta)_{ancestor} = (\Sigma\Delta)_{ancestor} + \Delta$ is set. Sometimes, an overflow may occur in a node during the insertion process when the number of data entries in the data node exceeds a specified threshold. In this case, the node is split into two nodes, and the same insert/split algorithm as that of the R*-tree can be adopted in the present invention. More details on insert/split algorithms of the R*-tree are described in detail in a thesis which is entitled "The R*-tree: an efficient and robust access method for points and rectangles" by N. Beckmann, H. Kriegel, R. Schneider, and B. Seeger and published in "Proceedings of ACM SIGMOD Int'l Conference on Management of Data," New Jersey, 1990, pp. 322–331, and cited as a reference. Assuming that a node S is split into $S_1$ and $S_2$, there is needed to recalculate ΣΔs of the parent of $S_1$ and $S_2$. Adjusted ΣΔs of the parent of $S_1$ and $S_2$ are reflected on all ancestor nodes in the tree up to the root node.

Figure 7:
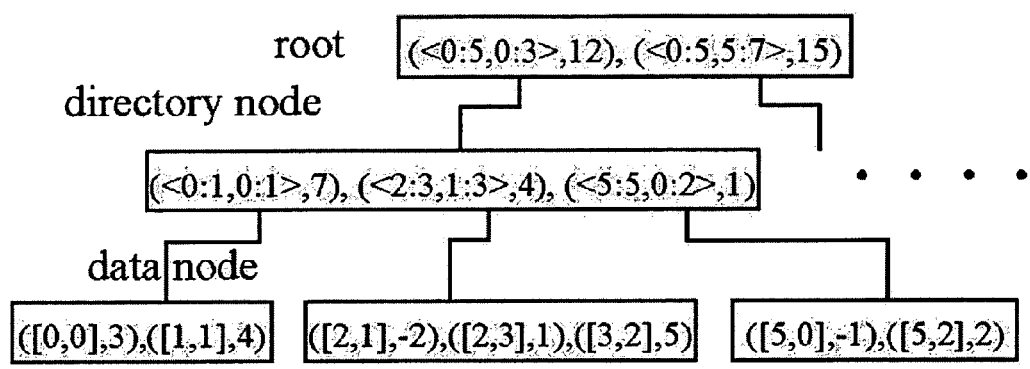
FIG. 7 is a block diagram showing a $\Delta$-tree update process when data of an arbitrary cell in the $\Delta$-tree of FIG. 6b is changed.

For example, when the value of the cell A [2,3] of FIG. 5a is changed from 4 to 6, the update process, that is, a process for reflecting the update request ([2,3], 2) on the Δ-tree is described with reference to FIG. 7 as follows.

First, an entry (<0:5,0:3>, 12) is selected in the root node. An entry (<2:3,1:3>, 4) is then selected in the intermediate node while traversing down the tree. Since the data entry with the position [2,3] is found in the node pointed-to by the entry (<2:3,1:3>, 4), the Δ value 2 of the data node [2,3] is added to its old value 1, resulting in 3. After the value of the data node is changed, the ΣΔs of ancestor nodes are changed from (<2:3,1:3>, 4) and (<0:5,0:3>, 12) to (<2:3,1:3>, 6) and (<0:5,0,3>, 14), respectively.

The dynamic update cube, according to the present invention as described above, provides a significant efficiency boost when compared to the conventional methods. In the present invention, the time complexity for updating a single cell in the Δ-tree is $O(\log N_u)$, where $N_u$ is the number of changed cells. Generally, the number of changed cells is very small compared to that of the total cells in the data cube. The complexity $O(\log N_u)$ corresponds to the length of traverse while descending a single path in the tree. Table 1 below shows the comparison of complexities among different methods. Here, $N=n^d$ and n is the number of cells in each dimension. Table 1 shows that the present invention outperforms other conventional methods since the size of the dynamic update cube is significantly smaller than that of the original data cube, that is, $N_u << N$.

TABLE 1

| Method | Update time |
| --- | --- |
| Prefix-sum[HAMS97] | $O(n^d)$ |
| Relative Prefix-sum[GAES99] | $O(n^{d/2})$ |
| Dynamic Data Cube[GAE00] | $O(\log^d n)$ |
| Dynamic Update Cube | $O(\log N_u)$ |

Table 2 below shows the comparison result of the update costs of various methods, when the dimensionalities (d) are 2, 4, and 8, and the size of each dimension is $10^1$ and $10^2$ using the above Table 1. For example, when d=4 and n=$10^2$, the total size of a data cube $N=n^d$ is $10^8$. At this time, the fan-out of the Δ-tree is assumed to be 10. That is, the base of log in the complexity Equation of the method in the present invention is 10. Generally, it is considered that $N_u$ is around 1% of N. Therefore, Table 2 represents the results for three cases, $N_u$=0.1%, 1%, and 10% of N, respectively.

TABLE 2

| | | | | | Dynamic | Dynamic Update Cube | | |
| --- | --- | --- | --- | --- | --- | --- | --- | --- |
| n | D | N = $n^d$ | Prefix-Sum | Relative PS | Data Cube | $N_u$ = 0.001N | $N_u$ = 0.01N | $N_u$ = 0.1N |
| 10 | 2 | $10^2$ | $10^2$ | $10^1$ | 11 | — | 1 | 1 |
| | 4 | $10^4$ | $10^4$ | $10^2$ | 118 | 1 | 2 | 3 |
| | 8 | $10^8$ | $10^8$ | $10^4$ | 14064 | 5 | 6 | 7 |
| 10 | 2 | $10^4$ | $10^4$ | $10^2$ | 43 | 1 | 2 | 3 |
| 0 | 4 | $10^8$ | $10^8$ | $10^4$ | 1897 | 5 | 6 | 7 |
| | 8 | $10^{16}$ | $10^{16}$ | $10^8$ | 3600406 | 13 | 14 | 15 |

Next, a hybrid query method is described as follows.

In real OLAP environments, users typically search for trends, patterns, or unusual data behaviours, by repeatedly issuing interactive queries. In this case, users may require approximate answers for queries so as to achieve the fastest possible response.

In the present invention, a hybrid method for providing either an approximate result or a precise one is proposed to reduce the overall cost of queries.

This method is highly beneficial for various applications requiring quick approximate answers rather than time consuming accurate ones, such as decision support systems. Therefore, the present invention provides an approximation technique, and shows how to reduce the errors of this approximation technique with little additional cost.

When a range-sum query is processed, an approximate answer is obtained by partially searching the Δ-tree: that is, when a search is performed from the root to a low-level node, it is performed from the root to an internal node instead of a leaf node. MBRs participating in the answer to a range-sum query are classified into two groups: inclusive MBRs and intersecting MBRs. The inclusive MBRs are defined as $MBR_i$ (i=1, . . . ,m), where m is the number of inclusive MBRs, and the intersecting MBRs are defined as MBRJ (j=m+1, . . . ,n), where n−m is the number of intersecting MBRs.

Figure 8:
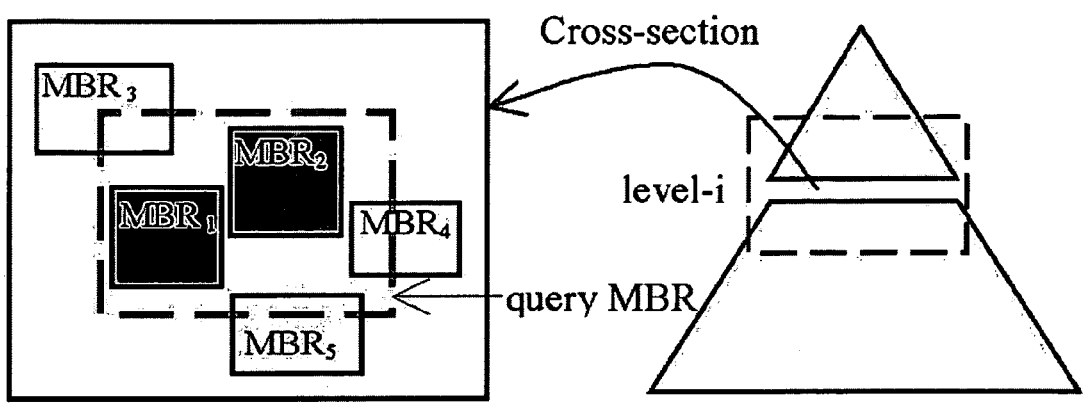
FIG. 8 is block diagram of MBRs and a query MBR in the level i of the $\Delta$-tree of this invention.

FIG. 8 is a view showing MBRs and a query MBR in level i of Δ-tree, and shows a process for obtaining an approximate answer using this invention. $MBR_1$ and $MBR_2$ are inclusive MBRs, while $MBR_3$, $MBR_4$ and $MBR_5$ are intersecting MBRs. Assuming that $(\Sigma\Delta)_i$ (i=1, . . . ,m) is the $\Sigma\Delta$ value of the i-th inclusive MBR, and $(\Sigma\Delta)_j$ (j=m+1, . . . ,n) is the $\Sigma\Delta$ value of each intersecting MBR, the answer of the range-sum query at level i of the Δ-tree can be approximated by the following Equation [7].

$$\text{Appox\_sum}(Q) = \sum_{i=1}^{m}(\Sigma\Delta)_i + \sum_{j=m+1}^{n}\left(\frac{\text{vol}(MBR_j \cap MBR_Q)}{\text{vol}(MBR_j)} \times (\Sigma\Delta)_j\right) + \text{PC\_sum}(Q) \quad [7]$$

Further, the present invention uses the list of mean positions to improve the approximation technique. That is, the area of a range query is resized to obtain a more accurate approximation. Nodes required for further searching are then determined using the difference between the approximation value both without and with resizing.

This process is described in detail as follows.

Figure 9:
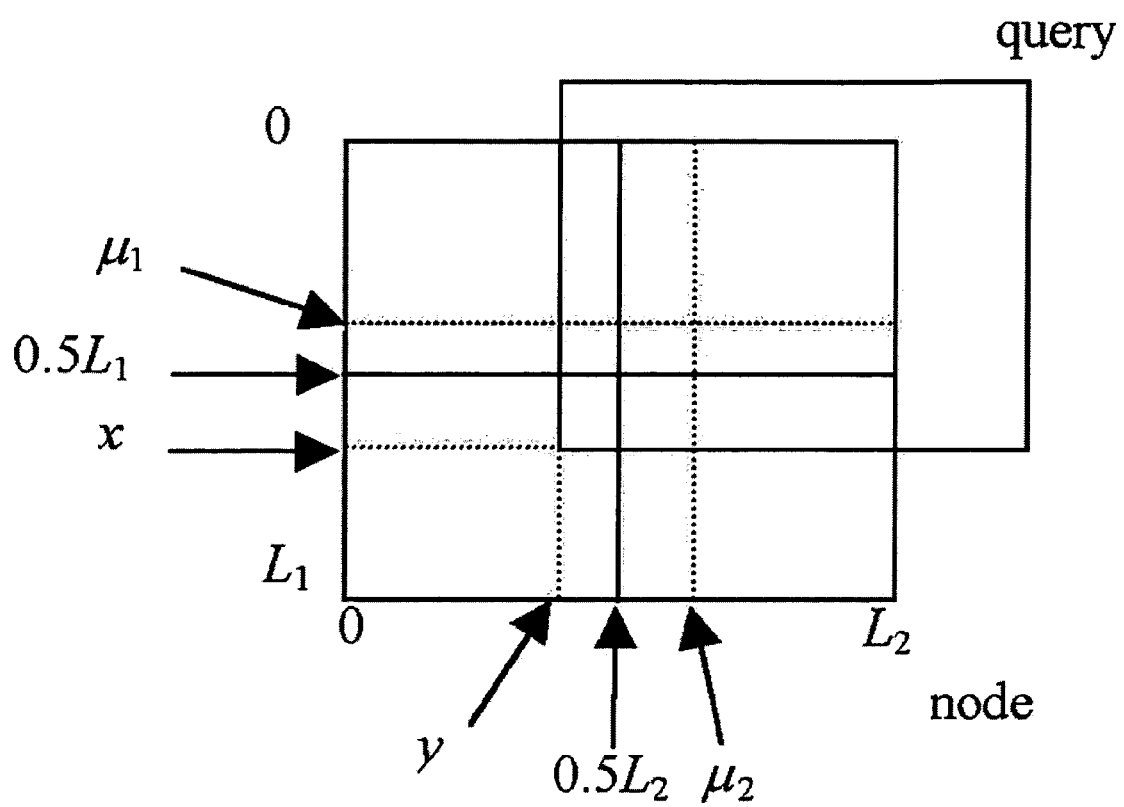
FIG. 9 is a view showing the resizing of the query MBR of this invention.

Referring to FIG. 9, the overlapping (intersecting) region is (0:x, y:$L_2$). Further, $\mu_1$ and $\mu_2$ are calculated, and the region is resized for a more accurate approximation. Consider the vertical side of the node. [0, $\mu_1$] contains a half of the data values. α is obtained such that if data are uniformly distributed, [0, α] contains data values contained in [0,x] when $\mu_1$ is the mean position.

Then, the Equation $$\alpha = \frac{L_1}{2}\left(1 + \frac{x - \mu_1}{L_1 - \mu_1}\right)$$

can be obtained from $$\frac{x - \mu_1}{L_1 - \mu_1} = \frac{\alpha - 0.5L_1}{0.5L_1}.$$

Therefore, 0:x is resized to $$0: \frac{L_1}{2}\left(1 + \frac{x - \mu_1}{L_1 - \mu_1}\right).$$

The resizing of y:$L_2$ can be similarly calculated to be $$\frac{L_2}{2} \times \frac{y}{\mu_2} : L_2.$$

The difference between the approximation values with resizing and those without resizing is used to find nodes to be searched down in the next (lower) level. That is, nodes whose differential values are bigger than others are selected.

When intersecting nodes in level i are searched, the error can be greatly reduced with little additional cost if a few nodes in Level i having big differences are searched to level i−1.

Then, the results of the experiments for evaluating performance of the present invention are described as follows. The method proposed in the present invention uses both the prefix-sum cube (PC) and the Δ-tree. That is, the update is only made on the Δ-tree and all updates are reflected on the prefix-sum cube periodically. Therefore, the update performance was evaluated by using the update on the Δ-tree in the experiments. To evaluate query efficiency, both the prefix-sum cube (PC) and the Δ-tree were considered, and to evaluate the accuracy of query results, only the Δ-tree was considered. The evaluation of the query efficiency was based on the number of page accesses and the elapsed time. The Δ-tree was implemented by modifying the R*-tree, and its node size was limited to 600 bytes such that the tree was deep enough to evaluate approximate results. In the experiments, uniform and Zipf distribution data were used. The z parameter of Zipf distribution data was determined to have a constant value (z=0.9) regardless of the dimension. The dimensionalities of the test data are 2, 3, 4, and 5. The cardinality of each dimension is 1024 for 2-dimension, 512 for 3-dimension, 128 for 4-dimension, and 64 for 5-dimension, respectively. The number of data elements to be inserted into the Δ-tree is 10000 to 50000. Three types of queries were used based on the size of query selectivity. The types of queries are large(=0.1), medium(=0.05), and small (=0.01), respectively. All experiments were performed on a Sun Ultra II workstation with 256M main memory and 10G hard disk. The error rates in the experimental results indicate the percentage error, and each experimental result was obtained by averaging the results of 30 executed queries.

Figure 10:
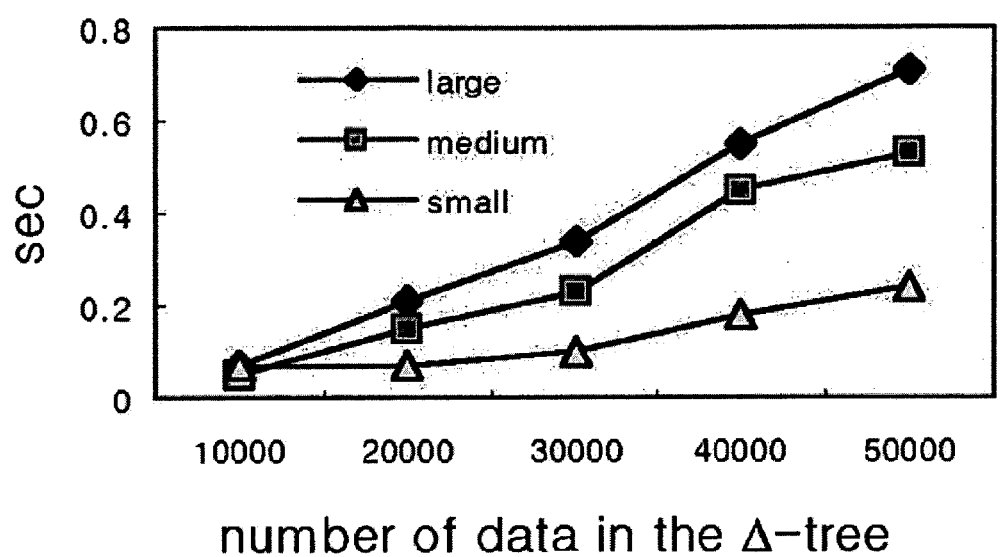
FIG. 10 is a graph showing the performance of a query execution in the dimensionality of three according to this invention.
Figure 11:
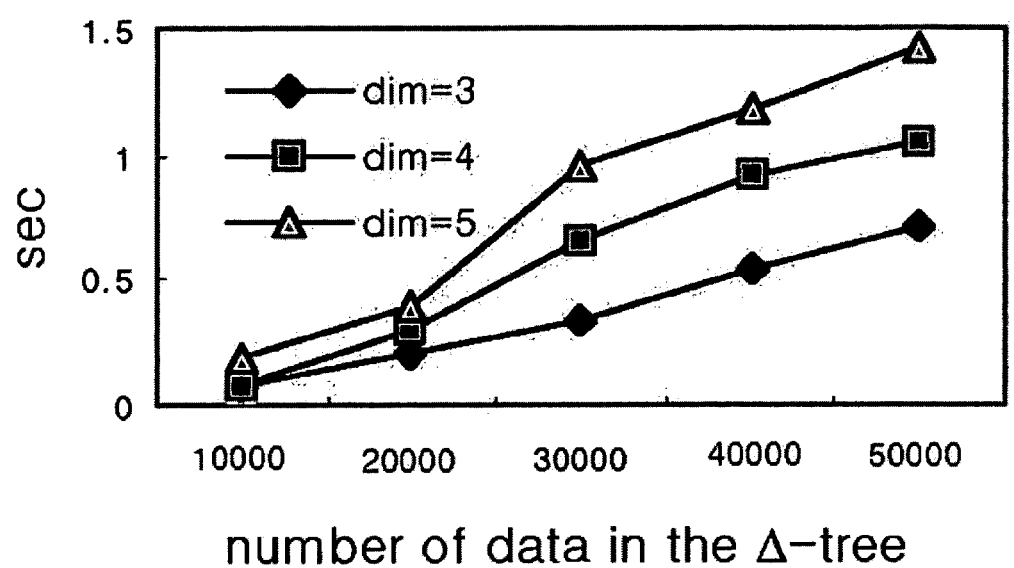
FIG. 11 is a graph showing the performance of a query execution in the dimensionality of three, four and five according to this invention.

FIG. 10 is a graph showing the efficiency of query execution for query sizes of large, medium, and small. FIG. 11 is a graph showing the results of the query execution for the medium-size query with respect to the dimensionalities of 3, 4, and 5, respectively. Those results were obtained by searching nodes of the Δ-tree from the root to level 0, i.e., the data node of the Δ-tree, when the query is executed; thus the results are exact. The efficiency of queries is measured by the execution time, and if the dimension is 3, the result shows a fast execution time of below one second.

Figure 12:
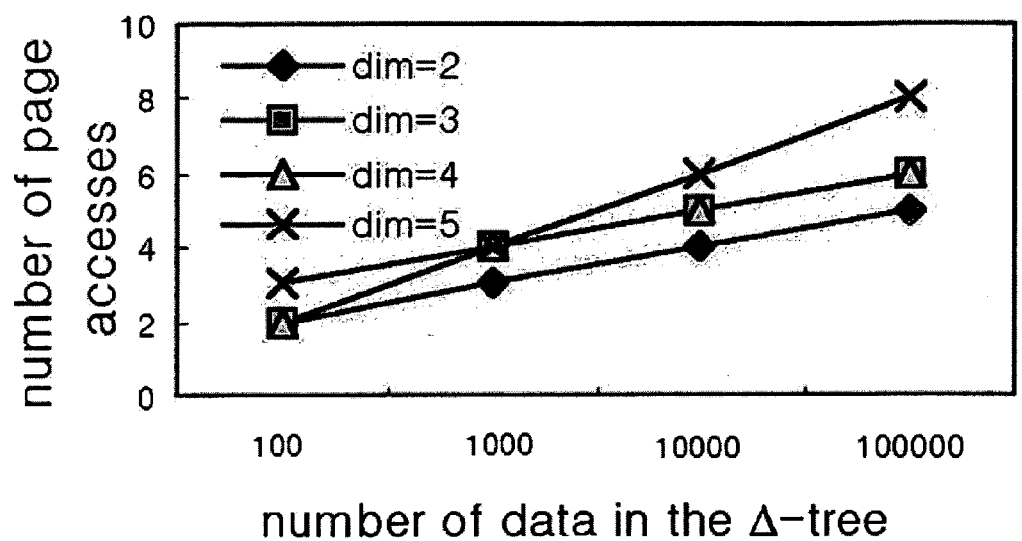
FIG. 12 is a graph showing the performance for inserting the value of a changed cell into the $\Delta$-tree according to this invention.

FIG. 12 shows the performance when inserting the value of a changed cell into the Δ-tree. Referring to FIG. 12, the X-axis represents the number of data elements in the Δ-tree while the Y-axis represents the number of page accesses to insert a single value into the tree, which corresponds to the depth of the Δ-tree. As shown in FIG. 12, the number of page accesses is O(log $N_u$), where $N_u$ is the number of changed cells.

Figure 13A:
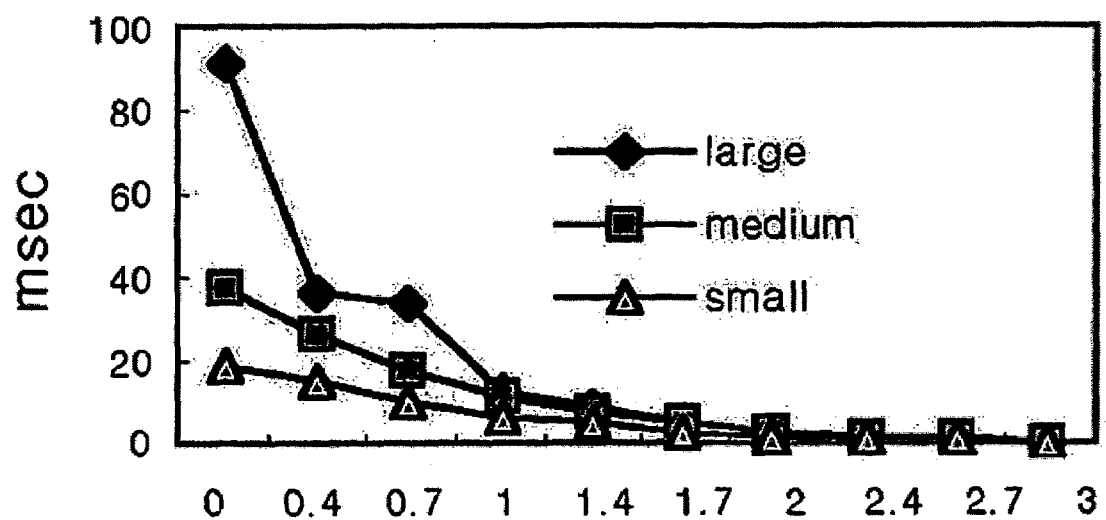
FIGS. 13a and 13b are graphs respectively showing the performance and error rates for obtaining approximate answers if data are uniformly distributed, the dimensionality is four, and the number of data is 10,000 according to this invention.
Figure 13B:
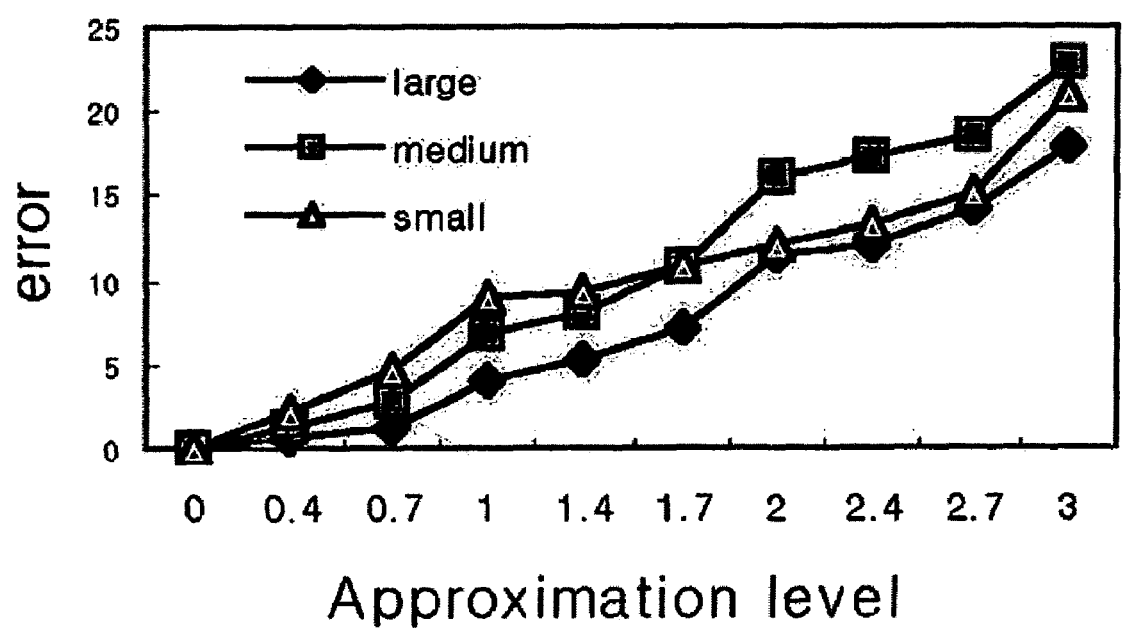

FIGS. 13a and 13b are graphs respectively showing the performance and error rates for obtaining approximate answers if data are uniformly distributed, the dimensionality is four, the query sizes are large, medium, and small, and the number of data is 10,000.

FIG. 13 shows the query performance and error rate when the query is executed using the approximate technique, provided that 10000 four-dimensional uniform data are stored in the Δ-tree. The X-axis represents the level of the Δ-tree in which the approximate query is performed. The level of data nodes which are leaf nodes are 0 and their parents are level 1 which is larger than that of the data nodes by 1. The approximation level 0 indicates that the query has searched up to the data node, and the approximation level 1 and 2 indicates that the query has searched up to Levels 1 and 2.

The approximation level 0.4 (=0.6×0+0.4×1) indicates that the query has searched up to level 1 for 40% of nodes at level 1, and up to level 0 for 60% of nodes at level 1. Similarly, the approximation level 1.7(=0.3×1+0.7×2) indicates that the query has searched up to level 2 for 70% of nodes at level 2, and up to level 1 for 30% of nodes at level 2. In this case, for nodes whose differences of approximation values are bigger, the search goes down to 1 lower level. As shown in FIG. 13, both the number of searched pages and the time are rapidly reduced as the approximation level becomes higher, while the error rate increases slightly. Therefore, high performance can be obtained within a reasonable error rate if the approximation level is increased appropriately.

Figure 14A:
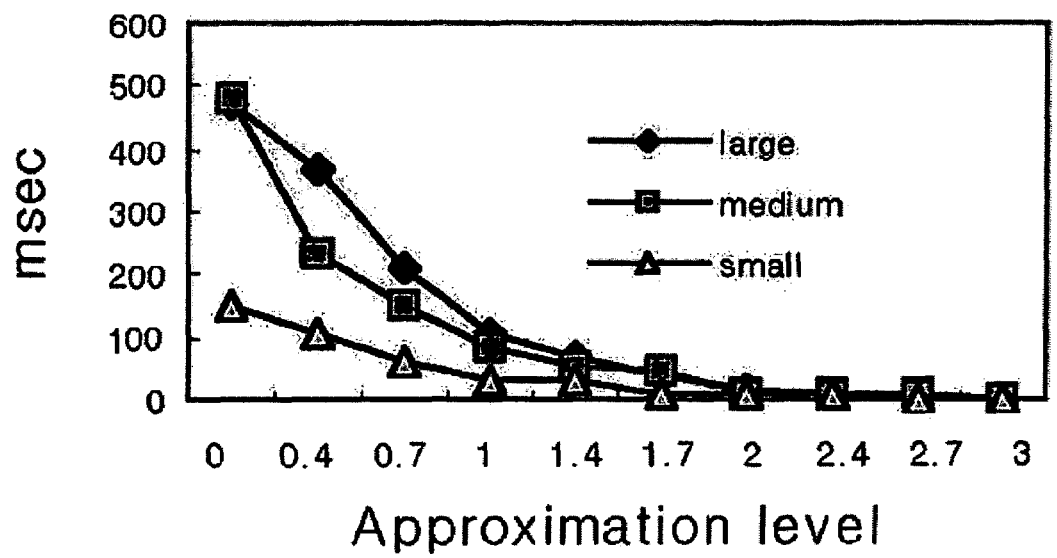
FIGS. 14a and 14b are graphs respectively showing the performance and error rates for obtaining approximate answers if data are uniformly distributed, the dimensionality is four, and the number of data is 50,000 according to this invention.
Figure 14B:
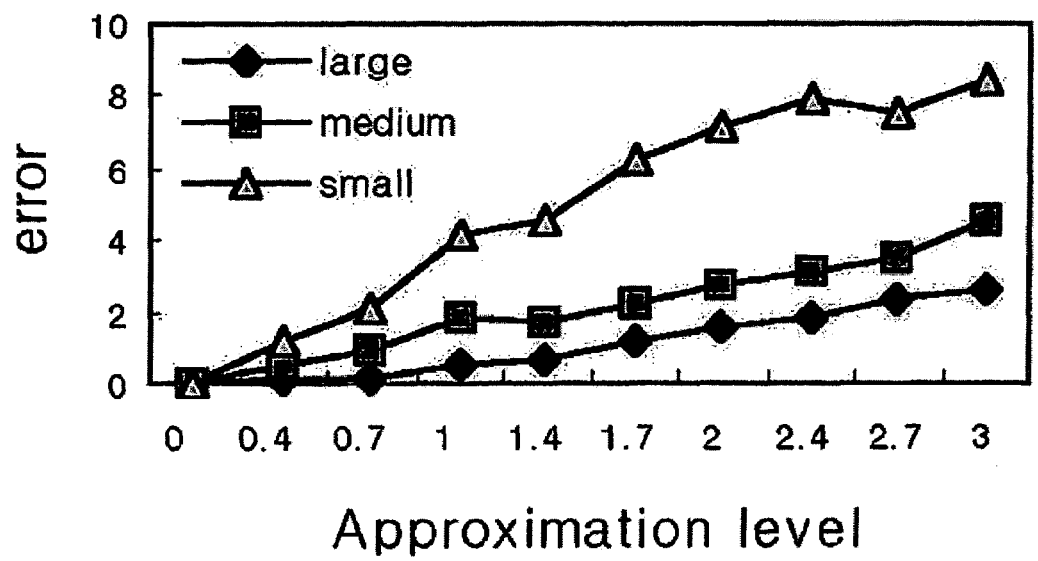

FIGS. 14a and 14b show the case that the number of data in the Δ-Tree is increased to 50000 under the same condition as that of FIG. 13. Referring to FIG. 14, the error rate is decreased as more data are stored in the Δ-Tree, while the query performances are decreased.

Figure 15A:
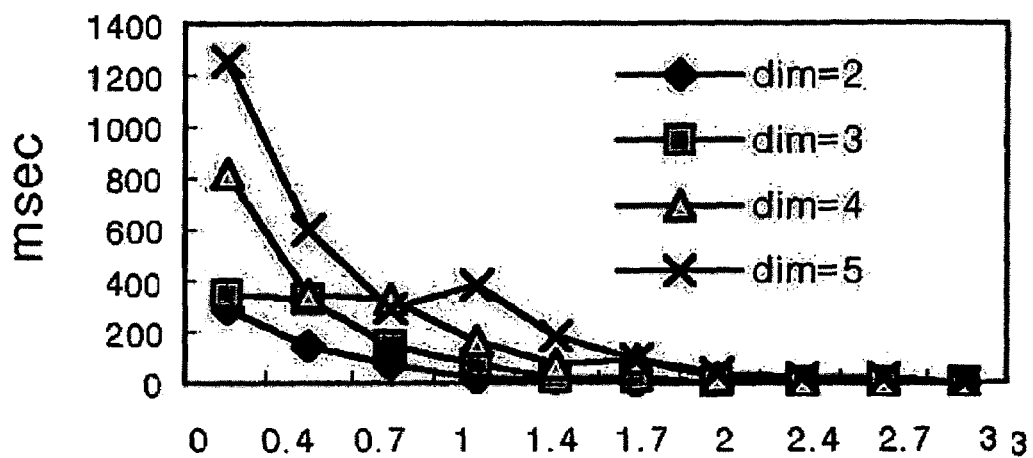
Figure 15A:
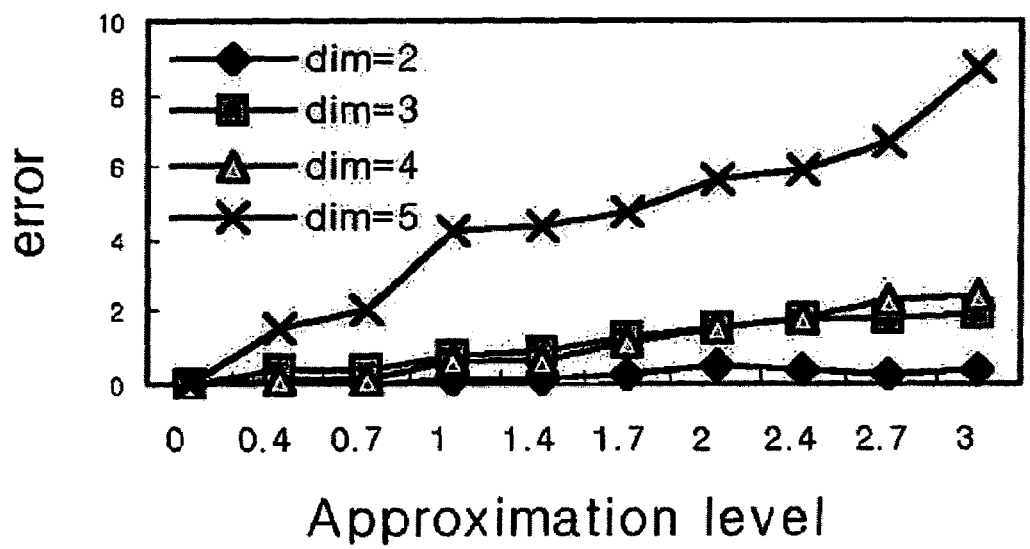
Figure 16A:
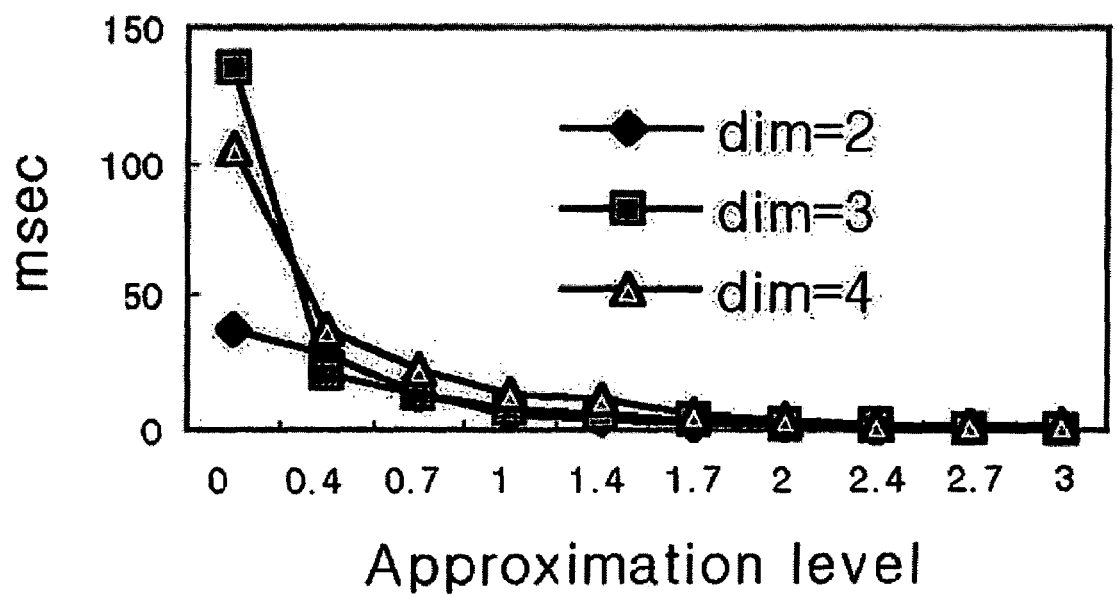
FIGS. 16a and 16b are graphs respectively showing the performance and error rates for obtaining approximate answers if data are Zipf distributed, the dimensionalities are varied from two to four, and the number of data is 50,000 according to this invention.
Figure 16B:
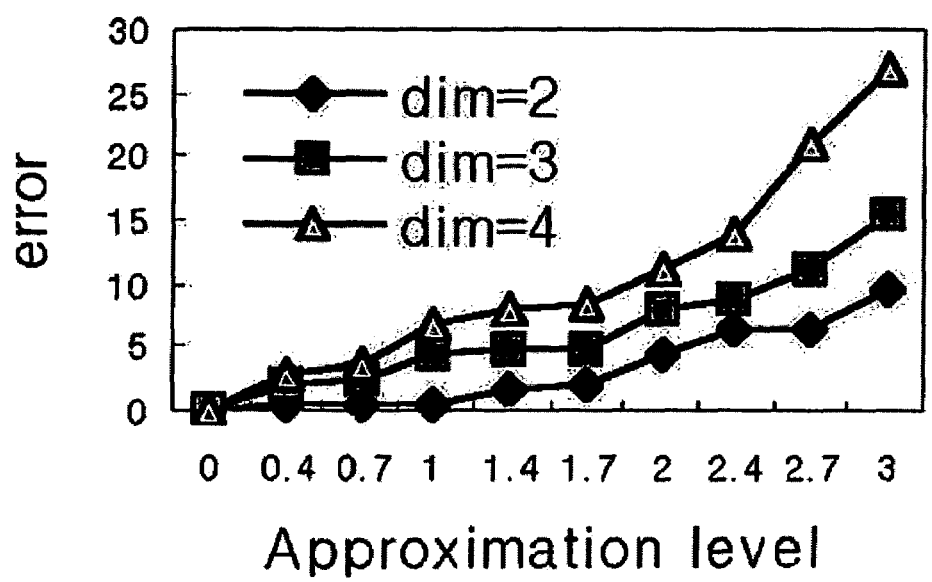

FIGS. 15a and 15b are graphs showing the query performance and error rates when the data are uniformly distributed, the number of data is 50000, the query size is large, and the dimensionality is varied from 2 to 5. FIGS. 16a and 16b are graphs showing the query performance and error rates when the data are Zipf distributed, the number of data is 50000 and the dimensionality is varied from 2 to 4.

As described above, the present invention provides a dynamic update cube, which uses a hierarchical data structure called Δ-tree, and is designed to significantly reduce the update cost of the data cube while maintaining reasonable search efficiency. If the dynamic update cube is used, some changed data cubes are not directly applied to the prefix-sum cube, and updated to the dynamic update cube, thus minimizing the update cost.

Further, the present invention provides a hybrid method which is advantageous in that it searches an approximate result as well as a precise one, with respect to OLAP queries, by using the hierarchical tree structure of a dynamic update cube, thus reducing the overall costs of queries. Further, this method is advantageous in that it is useful for various applications requiring quick approximate answers, such as decision support systems. Further, the update complexity of the hybrid method is O(log $N_u$), wherein $N_u$ is the number of changed cells in the data cube.

Further, in the present invention, a variety of experiments are performed with respect to various dimensions and query sizes. Experimental results show that the present invention is highly advanced in query and update efficiency and in the accuracy and efficiency of approximate results. Further, the hybrid method of this invention is advantageous in that it can considerably improve the query speed while maintaining reasonable approximation error rates.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. Method for processing a data cube for range-sum queries which includes a prefixed-sum cube to store the cumulative sum of data and a dynamic update cube using an multidimensional index structure called Δ-tree to store the updated values of the data cube comprising:

storing only the changed information of the cell in the data cube into the Δ-tree, which constructed by the same process as a R*-tree, in which initially, the Δ-tree has only a directory node called root node, and whenever the data cube cell is updated, the difference Δ between new and old values of the data cube cell and its spatial position information are stored in the Δ-tree, instead of updating directly to the prefixed-sum cube, wherein the directory node contains ($L_1, L_2, \ldots, L_n$), where $L_i$ is the tuple about i-th child node $C_i$ and has the form as (ΣΔ, M, $cp_i$, $MBR_i$); ΣΔ is the sum of all ΣΔ values (Δ values) of $C_i$ when $C_i$ is a directory node (data node); $cp_i$ is the address of $C_i$ and $MBR_i$ is the MBR enclosing all entries in $C_i$; M has the form of ($\mu_1, \mu_2 \ldots, \mu_d$), where d is the dimension and $\mu_j$, is the mean position of the j-th dimension of $MBR_i$ which is defined as $$\mu_j = \frac{\sum_{m=1}^{n_j} mF_j(m)}{\sum_{m=1}^{n_j} F_j(m)},$$

with $$F_j(m) = \sum_{\substack{k_h=1,n_h \\ k_j=m \\ h \neq j}} f(k_1, \ldots, k_j, \ldots, k_d)$$

where $f(k_1, k_2, \ldots k_d)$ is the value of an update position ($k_1, k_2, \ldots, k_d$) in $MBR_i$ with $1 \leq k_j \leq n_j$, and $n_j$ is the number of partitions of the j-th dimension of $MBR_i$, and the data node is at level 0 and it contains ($D_1, D_2, \ldots, D_n$), where $D_i$ is the tuple about i-th data entry and has the form ($P_i, \Delta_i$), with $P_i$ being the position index and $\Delta_i$ being the difference between the changed cell; and managing the Δ-tree to improve the update speed of the data cube.

2. Method for processing a data cube for range-sum queries according to claim 1, wherein when the value of a cell in the data cube is changed, an update request is given in the form (P, Δ), where P is the position index and Δ is the difference between new and old values of the changed cell;

the first step for the update is to identify a sub-tree into which the update is made; and the selection of the target sub-tree for the update is the same as that of an R*-tree, and a target data node to reflect the update request is finally selected by repeatedly identifying the sub-trees into which the update is made, and once the target data node is identified, it is determined whether or not a data entry with the position P exists in the node.

3. Method for processing a data cube for range-sum queries according to claim 1, further comprising:
answering a range-sum query by using both the prefixed-sum cube and the Δ-tree, the prefixed-sum cube including the information which had been most recently bulk updated while the Δ-tree including the information which has been updated from then on.

4. Method for processing a date cube for range-sum queries according to claim 3, wherein when a range sum query Q, where Q is $(l_1: h_1, l_2: h_2, \ldots, l_d: h_d)$, is given, the answer of the range sum query Q is given in the form of $Sum(Q) = PC_{13}\ sum(Q) + \Delta\_sum(Q)$, where $Sum(Q)$ is a function that returns the answer of Q, $PC\_sum(Q)$ is a function that returns the answer which is calculated from the prefixed-sum cube, and $\Delta\_sum(Q)$ is a function that returns the answer which was found from the Δ-tree.

5. Method for processing a data cube for range-sum queries which includes a prefixed-sum cube to store the cumulative sum of data and a dynamic update cube using an multidimensional index structure called Δ-tree to store the updated values of the data cube comprising:
storing only the changed information of the cell in the data cube into the Δ-tree which is constructed by the same process as a R*-tree, in which initially, the Δ-tree has only a directory node called root node, and whenever the data cube cell is updated, the difference Δ between new and old values of the data cube cell and its spatial position information are stored in the Δ-tree, instead of updating directly to the prefixed-sum cube;
clustering the update cells that are spatially close each other into a corresponding minimum bounding rectangle MBR, whereby when searching the Δ-tree, non-overlapping MBRs of the Δ-tree are pruned efficiently; and
managing the Δ-tree to improve the update speed of the data cube.

6. Method for answering OLAP range-sum queries by processing a data cube that includes a prefixed-sum cube and a dynamic update cube using an index structure called Δ-tree comprising:
processing an OLAP range-sum query that requires an approximate answer which is computed by searching from the root of the Δ-tree to an internal node of the level i, instead of a leaf node of the Δ-tree, wherein the answer of the range-sum query at the level i of the Δ-tree is approximated by the equation, $$Approx\_sum(Q) = \sum_{i=1}^{m}(\Sigma\Delta)_i + \sum_{j=m-1}^{n}\left(\frac{vol(MBR_J \cap MBR_Q)}{vol(MBR_J)} \times (\Sigma\Delta)_J\right) + PC\_sum(Q),$$

where $(\Sigma\Delta)_i (i=1, \ldots, m)$ is the ΣΔ value of the i'th inclusive MBR, $(\Sigma\Delta)_j (j=m+1, \ldots, n)$ is the ΣΔ value of each intersecting MBR and $PC\_sum(Q)$ is a function that returns the answer which is calculated from the prefixed-sum cube; and
providing an approximate by searching the Δ-tree partially, the searching being performed from the root to an internal node of the level i instead of a leaf node.

7. Method for answering OLAP range-sum queries according to claim 6, further comprising:
resizing the area of a range query for a more accurate approximation; and
calculating the difference between the approximation value without resizing and the approximation value with resizing to find nodes for further searching.

* * * * *

UNITED STATES PATENT AND TRADEMARK OFFICE
CERTIFICATE OF CORRECTION

PATENT NO. : 7,177,854 B2 Page 1 of 1
APPLICATION NO. : 10/120535
DATED : February 13, 2007
INVENTOR(S) : Seok-Ju Chun et al.

It is certified that error appears in the above-identified patent and that said Letters Patent is hereby corrected as shown below:

On the Title Page, Item (75) please delete "Mr. Ju-Hong Lee" in the inventor's section.

Signed and Sealed this

Twenty-second Day of May, 2007

JON W. DUDAS
*Director of the United States Patent and Trademark Office*